Oct. 3, 1950

H. SAMUELS 2,524,274

EXHAUSTION INDICATOR

Filed March 28, 1946

INVENTOR.
Harry Samuels
BY
Darby + Darby
ATTORNEYS

Patented Oct. 3, 1950

2,524,274

UNITED STATES PATENT OFFICE 2,524,274

EXHAUSTION INDICATOR

Harry Samuels, New York, N. Y.

Application March 28, 1946, Serial No. 657,705

1 Claim. (Cl. 200—84)

The present invention relates to a device for indicating the imminent exhaustion of a supply of liquid as, for example, beer.

As is well known, it is common practice at the present time to locate containers of beer in the basement or in other locations remote from the bar at which beer is served, the beer being piped from the containers to the bar. With this arrangement the bartender is given no warning of the imminent failure of the supply and consequently there is a complete exhaustion of beer in the system before any attempt is made to shift from the empty container to a full one. Further, with this arrangement, the pressure fluid (air) tends to fill the system so that a quantity of beer has to be wasted upon the tapping of a new keg.

By my arrangement the bartender is given a warning signal while there are still a number of glasses of beer in the supply line and can, therefore, tap a full barrel in time to avoid any inconvenience to the customer. Since the warning is given while there is still beer in the system, there is no danger of pressure fluid mixing with the beer and, consequently, no wastage upon tapping of a new keg.

My device comprises generally a small container which is inserted in the supply line and which is provided with a float and contact members so that upon the exhaustion of the liquid in the container a signal is given to the bartender and this signal occurs while there is sufficient of the liquid still in the connecting lines so that beer may continue to be drawn from the tap. This is to be contrasted for example with devices such as boiler water indicators and signalling means in which the indication is always one of low level in the boiler or container and does not take into account any remaining supply in the pipe lines which extend in the case of a barroom from the containers to the tap.

Additionally my device may be so arranged that instead of merely giving a signal to the bartender a means may be operated to automatically shift the connections to the tap from the exhausted container to a full one.

It is an object of my invention to provide an indicator which will advise of the exhaustion of the supply of liquid in a container while there is still sufficient liquid in the lines connecting that container to an outlet remote therefrom so that liquid may continue to be drawn from that outlet for a period of time.

It is another object of my invention to provide such an indicating device which may be utilized in connection with an annunciator whereby a number of my devices may serve to indicate exactly which of a large number of containers has been emptied so that a full container may be substituted therefor.

It is a further object of my invention to provide in addition to a signalling means, means for automatically transferring the pipe connection to an outlet for the liquid from an exhausted container to a full one.

It is a still further object of my invention to provide such a device which is extremely simple in construction and correspondingly economical to manufacture.

Other objects and features of the invention will appear when the following description is considered in connection with the annexed drawing, in which.

Figure 1:
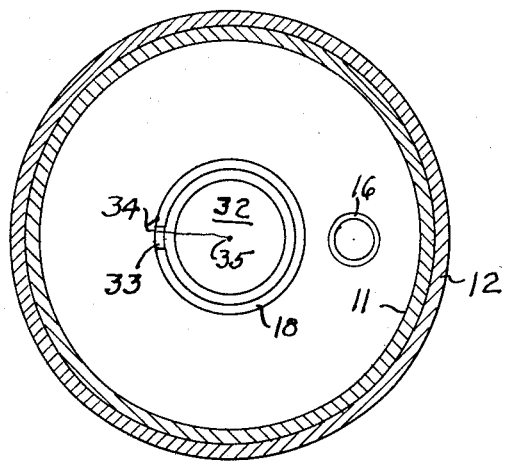
Figure 1 is a horizontal section of the device of my invention, the section being taken on the plane of the line 1—1 of Figure 2.
Figure 2:
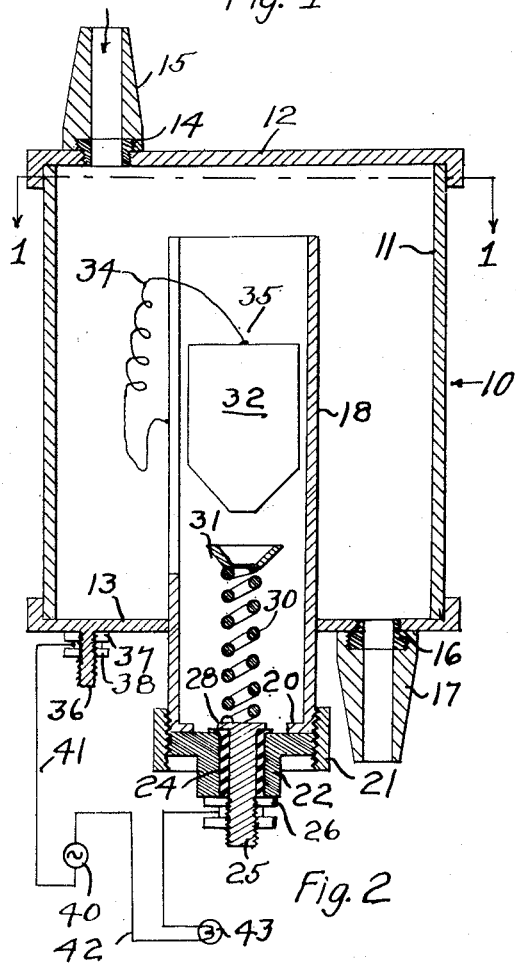
Figure 2 is a vertical central section of the device of my invention including also a schematic diagram of circuits which may be utilized in connection therewith.

Referring now to the drawings and particularly to Figures 1 and 2 thereof the device comprises a cylindrical receptacle 10 composed of the cylindrical wall member 11 and the upper and lower plates 12 and 13. Fastened to the upper plate 12 in any suitable manner and located near the outer wall 11 is a pipe coupling 14 to which is threaded the usual tapered pipe connector 15. This connector 15 is connected by means of a suitable pipe (not shown) to the liquid container as, for example, a beer keg from which beer is to be supplied to a bar. The beer is maintained under pressure in the normal manner and a valve is supplied intermediate the keg and the device 10 so that pressure will not be lost from the system during replacement of the keg. Furthermore, this valve serves to prevent beer in the line from draining back by gravity and overflowing the device 10.

The lower plate 13 is likewise provided with a pipe connector 16 and a tapered pipe connector 17 is fastened thereto in any suitable manner; the pipe, which is in turn fastened to the connector 17, leading to the tap or faucet from which the liquid is to be drawn.

Centrally of the bottom plate 13 and extending therethrough is a cylinder 18 which terminates at its upper end at a point adjacent to but slightly spaced from the upper plate 12. The lower end of the cylinder 18 is provided with the inturned rim 20 and the surface of the cylinder 18 is threaded adjacent its inturned rim 20 to provide a thread on which a nut 21 is adjustable. Nut 21 likewise cooperates with the closure member 22 and causes it to form a liquid-tight seal against the inturned rim 20 of the member 18. Extending through the closure member 22 centrally thereof is an insulating sleeve 24 which sleeve surrounds a screw 25 which screw is held in position by means of the nut 26. As can be seen from the drawing, particularly Figure 2 thereof, a head 28 of the screw 25 bears against a turned over rim of the insulating sleeve 24 and thereby serves to seal the hole through the closure member 22 against passage of liquid therethrough. Fastened to the head 28 of screw 25 in any suitable manner is a spring 30 which terminates in a cup member 31.

A float member 32 is provided and is confined within the tube 18, the float member being normally supported on the liquid and out of contact with the cup 31 but being capable of making contact with the cup 31 if the liquid level is reduced to a predetermined extent. A slot 33 is provided in the tube 18 and an electrical conductor 34 extends from its connection 35 to the float 32 through the slot 33 and is fastened to the tube 18 on the exterior thereof.

Formed as a part of the plate 13 or suitably connected thereto is a stud 36 which is threaded and provided with nuts 37 and 38. A source of current 40 is connected by means of conductor 41 to the stud 36, the terminal of conductor 41 being clamped between the nuts 37 and 38 in the usual manner. The opposite side of the source 40 is connected by means of a conductor 42 to a signalling means such as lamp 43 and thence to the screw 25. It will be seen that when the float 32 is lowered so that it makes contact with the cup 31, a circuit from the source 40 is completed through the spring 30, cup 31, float 32, conductor 34, tube 18, plate 13 and stud 36 to the opposite side of the source thereby energizing the signalling means which may be a lamp such as 43 or any other suitable indicator as, for example, a bell or an annunciator drop. This signal may be located adjacent the tap so that the bartender will be advised of the imminent exhaustion of the supply of fluid to the tap or may be placed in the basement adjacent the containers so that an attendant therein may be advised and may replace the empty container with a full one. Of course, if desirable, indicators may be placed in both locations and such indicators may be wired either in series or in parallel as is preferable.

Figure 3:
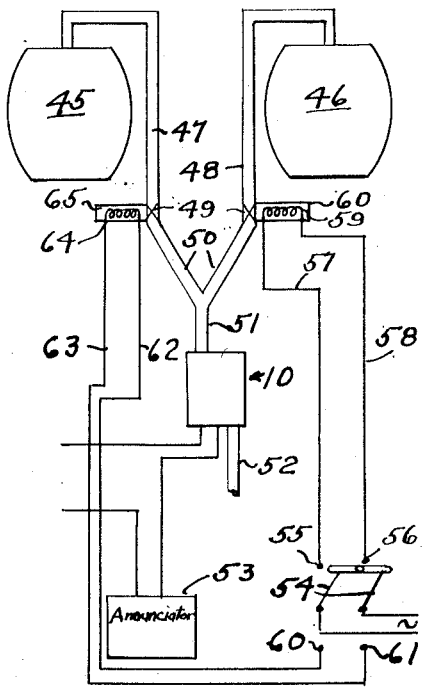
Figure 3 is a schematic diagram illustrating the application of my invention to provide a means under control of a bartender or other attendant for transferring the connections from an empty container to a full one while giving indication that such transfer has been effected.

In Figure 3 there is shown an arrangement whereby a single device 10 may be utilized to indicate the exhaustion of the supply in either one of the pair of containers such as 45 and 46. This arrangement is particularly valuable in connection with barrooms in which one brand of beer is favored over others and in which normally two or more taps are devoted to the particular favored beer. By the arrangement which is shown in Figure 3, the same result can be obtained while devoting a single tap rather than a pair thereof to the favorite beer since there need never be any time lost in replacing an empty keg with a full one.

In the arrangement of Figure 3, each pipe 47 and 48 leading from the kegs is supplied with a valve 49. Beyond the valves there is provided a Y or T 50, the common leg of which is connected by a pipe 51 to the inlet of a device 10 such as has been described in detail hereinabove. The outlet 52 from the device 10 will lead to a tap located at the bar.

In this instance a source of low voltage alternating current such as the source 40 of Figure 2 is again provided and connected through the contacts within the device 10 in the same manner as was shown in Figure 2. It may be noted that in each instance, the voltage supplied to the device 10 by the source 40 should be low voltage alternating current in order that the relatively saline fluid shall not conduct the current and thereby give a false indication.

In Figure 3 the circuit from source 40 through the contacts in the device 10 has been shown as including an annunciator 53 which may be of any of the common types of such devices. Located adjacent the annunciator or in some other suitable position near the bar there is provided a double-pole, double-throw switch 54, the blades of which are connected to a source of current which may be either direct or alternating and may be of any suitable voltage. Contacts 55 and 56 of this switch are connected by means of conductors 57 and 58 respectively to a winding 59 of a magnet 60 which is arranged to operate the right hand one of the valves 49. In like manner, contacts 60 and 61 of switch 54 are connected by means of conductors 62 and 63 respectively to the terminals of a winding 64 of a magnet 65 which controls the valve 49 associated with pipe 47. Thus, the bartender may, by throwing the switch to one of its two positions, operate one of the magnets 60 and 65 to thereby operate one of the valves 49. The valves 49 are spring returned valves so that whenever the magnet associated with one of these valves is deenergized the valve is closed. Consequently, the switch 54 is preferably a toggle switch, so that it will always be in one of its two operative positions and one or the other of the magnets 60 and 65 will always be deenergized and the other energized. To illustrate, closure of the circuit through contacts 55 and 56 will cause energization of magnet 60 and opening of the valve 49 in the pipe line 48. As a consequence, beer will be supplied from a barrel or keg 46 through pipe 48, valve 49, Y 50, pipe 51, device 10 and pipe 52 to the beer tap. The bartender will continue to draw beer from this tap until finally the beer in the keg 46 is exhausted and the float 32 in the device 10 moves downwardly and makes contact with the cup 31. At this time, current flowing through the float 32 and cup 31 will cause operation of the annunciator drop associated with the particular pair of kegs 45 and 46 considered. This will indicate to the bartender that the keg from which beer is being drawn is empty and he will then throw switch 54 into position such that it makes contact with contacts 60 and 61. This operation will open the circuit to magnet 60 and close the circuit to magnet 65 resulting in the closing of the valve 49 in pipe 48 and the opening of the valve 49 in pipe 47. Thereupon beer will flow from the keg 48 to the tap through the device 10. The refilling of device 10 will, of course, cause opening of the circuit to the annunciator so that upon restoration of the drop, the drop will remain up and no indication will be given until keg 45 is empty. When this keg becomes empty, the contacts will again close and the annunciator will again operate, and, it being assumed that the empty keg 46 has in the meanwhile been replaced with a full keg, it is only necessary for the bartender to again throw switch 54 to cause connection of another full keg to the tap.

If it is desirable, the magnets 60 and 65 and the associate switch may of course be omitted and the valves 49 operated by hand to effect the same result as has been described hereinabove. In this case, the valve 49 associated with the empty keg should always be closed before replacing that keg in order that there be no escape of pressure from the system and no opportunity for beer to discharge by gravity from the tap backwardly through the pipe lines in device 10 and thence through the pipe connection to the barrel (disconnected from the barrel when the tapping rod is removed).

Figure 4:
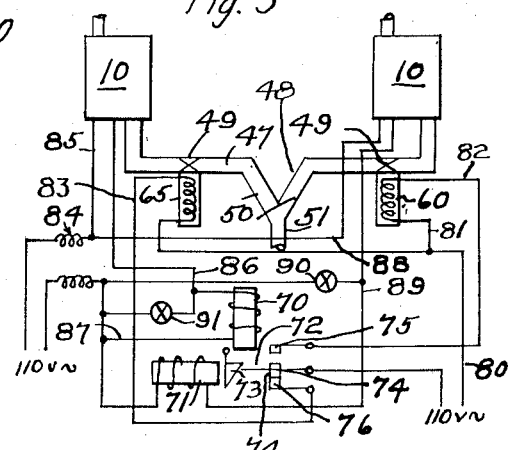
Figure 4 shows the utilization of a pair of my devices for automatically transforming the tap connections from an empty container to a full container together with signal lights arranged so that the bartender may be advised of the fact that a container is empty and thereby placed in a position to cause replacement of the container.

Referring now to Figure 4, two containers, or kegs (not shown), feed into two devices 10 and the outlet pipes from these two kegs are provided with the valves 49 which are of the same type as described in connection with Figure 3. From these valves, the pipe lines 47 and 48 extend to the arms of the Y 50 from which device the pipe 51 extends to the tap.

In the circuit of Figure 4, there is provided a relay pair 70 and 71 of common type and sold commercially by Edwards & Company being designated by them as Catalog No. 946.

This relay pair is arranged with two armatures respectively designated 72 and 73. Armature 73 cooperates with relay 71 and is provided with an extension which overlies armature 72 of relay 70. Armature 72 carries contacts 74 which cooperate with the fixed contacts 75 and 76. Armature 72 is biased so that normally a circuit is closed through contacts 74 and 76. When relay 70 is energized armature 72 is attracted and moves upwardly as shown in Figure 4 along the sloping portion of armature 73 of relay 71. This forces armature 73 to move in a clockwise direction until armature 72 gets above the horizontal portion of armature 73 at which time armature 73 moves counterclockwise and holds armature 72 in its upper position with contacts 75 making with contacts 74.

This condition exists despite deenergization of relay 70, and until relay 71 is energized. Energization of relay 71 causes clockwise oscillation of armature 73 and therefore releases armature 72 to return to its normal biased position in which contacts 74 make with contacts 76.

As utilized in the circuit of Figure 4, contact 74 is connected to one side of a power supply line which may, for example, be 110 volt 60 cycle line. The other side of the line is connected by means of conductors 80 and 81 to one side of the magnets 60 and 65. The other side of magnet 60 is connected by means of conductor 82 to contact 75 of relay 70 while the second side of the winding of magnet 65 is connected by means of conductor 83 to contact 76 of relay 70.

A source of current supply which may be of 110 volts 60 cycles is connected to the primary of the transformer 84, the secondary of this transformer being capable of supplying a low voltage alternating current (for example, 12 volts 60 cycles) to the signal circuit which is similar to that already described in connection with Figures 2 and 3 but is in this instance provided in duplicate.

Thus conductor 85 leads from one side of the secondary of transformer 84 through the left hand one of the devices 10 and thence through conductor 86 to the winding of relay 70 and through conductor 87 to the other side of the secondary of transformer 84. Connected in parallel to the winding of the relay 70 is an indicator 91 which may be a lamp, annunciator, bell, or other suitable device similar to those already described in connection with Figures 2 and 3.

In a like manner, conductor 88 leads from one side of the secondary of transformer 84 to the right hand one of the devices 10 and is connected as has been described to the float of that device. When the contacts of the device 10 are closed, the circuit is completed through conductor 89 and the winding of relay 71 to the opposite end of the secondary of transformer 84. As before, a signal lamp 90 or other suitable indicator device is connected in parallel with the winding of relay 71.

When the beer in the keg connected to the left hand one of the devices 10 is exhausted, the float in that device will descend and complete a circuit through the winding of relay 70 and the signal device 91 in parallel. Relay 70 will then operate thereby causing deenergization of the left hand magnet 65 and closure of the left hand one of the valves 49. At the same time, magnet 60 will be energized and will thereby cause opening of the right hand one of the valves 49. As a result, beer will be drawn from the right hand one of the two kegs and dispensed through the tap associated with these two kegs. Further the operation of the signal device 91 will indicate that the left hand one of the two kegs is empty and therefore the bartender may direct the replacement of this keg. If desirable, a second signalling device may be placed adjacent the supply kegs so that a porter or other attendant will be notified that the particular keg is empty and replace it.

The float in the left hand one of the devices 10 will remain in this lower position and relay 70 will continue energized as will the associated signal device 91. However, upon replacement of the keg connected to the left hand one of the devices 10 with a full keg, the float in the associated devices 10 will rise and the circuit to relay 70 will be broken. This, however, will be ineffective since armature 74 is locked in operated position by means of armature 73 in the manner already described. The signal device 91 will also be deenergized and this will indicate to the bartender that replacement of the empty keg has been made.

When the keg associated with the right hand one of the two devices 10 becomes empty, the float in that keg will descend and a circuit will be completed through relay 71 which will then operate to unlock armature 74 and permit restoration thereof to its lower position in which the circuit to the magnet 60 is broken and that to magnet 65 is completed. Thus, the right hand and now empty keg is removed from the line and the left hand and now full (replacement keg) is connected to the line and signal 91 is operated.

While I have described a preferred embodiment of my invention and have likewise described a number of methods whereby the indicating device may be utilized these descriptions were given particularly for purposes of illustration and I wish therefore not to be limited thereby but to be limited solely by the appended claim.

What is claimed is:

An indicator for utilization in the supply line between a reservoir of pressurized liquid and an outlet therefor, said indicator comprising a container, a liquid inlet and a liquid outlet for the liquid in said container, said inlet being at the top of said container and said outlet at the bottom, said inlet and outlet being at opposite sides of the container, a tube mounted generally centrally of said container and extending to within a short distance of the upper wall thereof, the positioning of said tube and the positioning of said inlet and outlet together serving to reduce turbulence within said tube, a float confined within said tube and adapted to rise and fall in accordance with the liquid level in said container, means electrically connecting said float to the exterior wall of said container, means mounted centrally of said tube at the lower portion thereof and extending externally of said tube, said means being insulatingly mounted, and means cooperating with said last mentioned means and underlying said float to form an electrical contact for the completion of an external circuit upon the liquid level reaching a predetermined point.

HARRY SAMUELS.

REFERENCES CITED

The following references are of record in the file of this patent:

UNITED STATES PATENTS

| Number | Name | Date |
| --- | --- | --- |
| 684,893 | Whitfield | Oct. 22, 1901 |
| 912,970 | Marsh | Feb. 16, 1909 |
| 929,116 | Apt et al. | July 27, 1909 |
| 1,311,244 | Pippin | July 29, 1919 |
| 1,522,082 | Ruths | Jan. 6, 1925 |
| 1,768,446 | Gron | June 24, 1930 |
| 2,084,051 | Van Vulpen et al. | June 15, 1937 |
| 2,127,875 | Lippert et al. | Aug. 23, 1938 |
| 2,138,677 | Meyer | Nov. 29, 1938 |
| 2,253,260 | Alcorn | Aug. 19, 1941 |
| 2,261,495 | Ewertz | Nov. 4, 1941 |

FOREIGN PATENTS

| Number | Country | Date |
| --- | --- | --- |
| 15,195 | Great Britain | 1914 |